US009812020B2

(12) United States Patent
Lee et al.

(10) Patent No.: US 9,812,020 B2
(45) Date of Patent: Nov. 7, 2017

(54) ELECTRONIC DEVICE AND UNMANNED AERIAL VEHICLE CONTROL METHOD

(71) Applicant: HON HAI PRECISION INDUSTRY CO., LTD., New Taipei (TW)

(72) Inventors: Hou-Hsien Lee, New Taipei (TW); Chang-Jung Lee, New Taipei (TW); Chih-Ping Lo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 35 days.

(21) Appl. No.: 14/825,718

(22) Filed: Aug. 13, 2015

(65) Prior Publication Data

US 2017/0046961 A1 Feb. 16, 2017

(51) Int. Cl.
G08G 5/00 (2006.01)
G08G 5/04 (2006.01)
G01S 5/16 (2006.01)
G01S 3/786 (2006.01)

(52) U.S. Cl.
CPC ........... G08G 5/0069 (2013.01); G08G 5/045 (2013.01); G01S 3/7865 (2013.01); G01S 5/16 (2013.01)

(58) Field of Classification Search
USPC .............................. 701/4, 302; 434/31, 33, 35
See application file for complete search history.

(56) References Cited

U.S. PATENT DOCUMENTS

| 5,581,250 A * | 12/1996 | Khvilivitzky | G01S 11/12 340/945 |
| 6,819,982 B2 * | 11/2004 | Doane | B64C 13/20 244/135 A |
| 7,876,258 B2 * | 1/2011 | Abraham | G08G 5/045 342/140 |

(Continued)

FOREIGN PATENT DOCUMENTS

| CN | 101385059 B | * | 9/2010 | ........... G08G 5/0069 |
| CN | 105514870 A | * | 4/2016 | ............... H02G 1/02 |

(Continued)

OTHER PUBLICATIONS

Autonomous MAV flight in indoor environments using single image perspective cues; Cooper Bills; Joyce Chen; Ashutosh Saxena Robotics and Automation (ICRA), 2011 IEEE International Conference on; Year: 2011; pp. 5776-5783, DOI: 10.1109/ICRA.2011.5980136.*

(Continued)

Primary Examiner — Cuong H Nguyen
(74) Attorney, Agent, or Firm — Steven Reiss

(57) ABSTRACT

An electronic device including a processing unit and a storage device receives digital images of a flight area of an unmanned aerial vehicle (UAV) captured by an image capturing device. Then, the processing unit determines a flight position of the UAV in the flight area based on the digital images, and controls the UAV to move from the flight position to a predetermined position. The processing unit receives a vehicle direction of the UAV from an electronic (Continued)

compass unit of the UAV, and adjusts the vehicle direction of the UAV based on a predetermined direction. The processing unit controls the UAV to perform a predetermined operation when the UAV reaches the predetermined position and the vehicle direction is the same as the predetermined direction.

12 Claims, 7 Drawing Sheets

(56) References Cited

U.S. PATENT DOCUMENTS

| | | | | |
|---|---|---|---|---|
| 8,761,964 B2* | 6/2014 | Lee | | B64C 19/00 244/189 |
| 8,989,924 B2* | 3/2015 | Seydoux | | A63H 27/12 244/17.13 |
| 9,097,532 B2* | 8/2015 | Kotaba | | G01C 21/005 |
| 2009/0294573 A1* | 12/2009 | Wilson | | B64C 39/024 244/2 |
| 2011/0178658 A1* | 7/2011 | Kotaba | | G01C 21/005 701/3 |
| 2011/0210872 A1* | 9/2011 | Molander | | G01S 11/12 340/961 |
| 2012/0296497 A1* | 11/2012 | Lee | | G05D 1/0202 701/3 |
| 2013/0192451 A1* | 8/2013 | Scott | | F41G 3/147 89/41.05 |
| 2013/0253733 A1* | 9/2013 | Lee | | B64C 19/00 701/2 |
| 2013/0325217 A1* | 12/2013 | Seydoux | | A63H 27/12 701/4 |
| 2014/0172194 A1* | 6/2014 | Levien | | G08G 5/0091 701/2 |
| 2014/0257596 A1* | 9/2014 | Paulsen | | G05D 1/0038 701/2 |
| 2014/0316616 A1* | 10/2014 | Kugelmass | | G05D 1/101 701/8 |
| 2016/0009390 A1* | 1/2016 | Kugelmass | | G05D 1/101 701/7 |
| 2016/0035224 A1* | 2/2016 | Yang | | H04B 7/18506 701/23 |
| 2016/0046373 A1* | 2/2016 | Kugelmass | | G05D 1/101 701/2 |
| 2016/0046374 A1* | 2/2016 | Kugelmass | | G05D 1/101 701/8 |
| 2016/0332748 A1* | 11/2016 | Wang | | B64F 1/00 |

FOREIGN PATENT DOCUMENTS

| | | | | |
|---|---|---|---|---|
| EP | 001424283 A1 * | 6/2004 | | B64C 39/02 |
| EP | 1999737 B1 * | 4/2013 | | G08G 5/0069 |
| GB | 002450987 A * | 1/2009 | | G08G 5/00 |
| WO | WO 2008020889 A2 * | 2/2008 | | G08G 5/0069 |

OTHER PUBLICATIONS

Reconfigurable robotic system based on mono-camera guidance; Dan Popescu; Loretta Ichim; Radu Fratila; Diana Gornea Electronics, Computers and Artificial Intelligence (ECAI), 2014 6th International Conference on; Year: 2014 pp. 45-50, DOI: 10.1109/ECAI.2014.7090222.*

On the Accuracy of Dense Fisheye Stereo; Johannes Schneider; Cyrill Stachniss; Wolfgang Förstner; IEEE Robotics and Automation Letters; Year: 2016, vol. 1, Issue: 1; pp. 227-234, DOI: 10.1109/LRA.2016.2516509.*

UAV obstacle avoidance using RGB-D system; Milton C. P. Santos; Lucas V. Santana; Alexandre S. Brandão; Mário Sarcinelli-Filho; 2015 International Conference on Unmanned Aircraft Systems (ICUAS); Year: 2015; pp. 312-319, DOI: 10.1109/ICUAS.2015.7152305.*

On 3D path following control of a ducted-fan UAV on SO(3); Venanzio Cichella; Roberto Naldi; Vladimir Dobrokhodov; Isaac Kaminer; Lorenzo Marconi; 2011 50th IEEE Conference on Decision and Control and European Control Conference Year: 2011; pp. 3578-3583, DOI: 10.1109/CDC.2011.6161419.*

Fuzzy Logic Controllers for navigation and control of AR. Drone using Microsoft Kinect; Prahlad Vadakkepat; Tze Chiang Chong; Willson Amalraj Arokiasami; Xu Weinan; 2016 IEEE International Conference on Fuzzy Systems (FUZZ-IEEE) Year: 2016; pp. 856-863, DOI: 10.1109/FUZZ-IEEE.2016.7737778.*

Open source computer-vision based guidance system for UAVs on-board decision making; Hyunwoong Choi; Mitchell Geeves; Bilal Alsalam; Felipe Gonzalez; 2016 IEEE Aerospace Conference; Year: 2016; pp. 1-5, DOI: 10.1109/AERO.2016.7500600.*

Recovering Translucent Objects Using a Single Time-of-Flight Depth Camera; Hyunjung Shim; Seungkyu Lee; IEEE Transactions on Circuits and Systems for Video Technology; Year: 2016, vol. 26, Issue: 5; pp. 841-854, DOI: 10.1109/TCSVT.2015.2397231.*

* cited by examiner

ELECTRONIC DEVICE AND UNMANNED AERIAL VEHICLE CONTROL METHOD

FIELD

The subject matter herein generally relates to unmanned aerial vehicle control.

BACKGROUND

When a robotic arm is used in an automatic manufacturing process, the robotic arm is fixed so that the work area of the robotic arm is restricted due to the length of the robotic arm.

BRIEF DESCRIPTION OF THE DRAWINGS

Implementations of the present technology will now be described, by way of example only, with reference to the attached figures.

DETAILED DESCRIPTION

Figure 1:
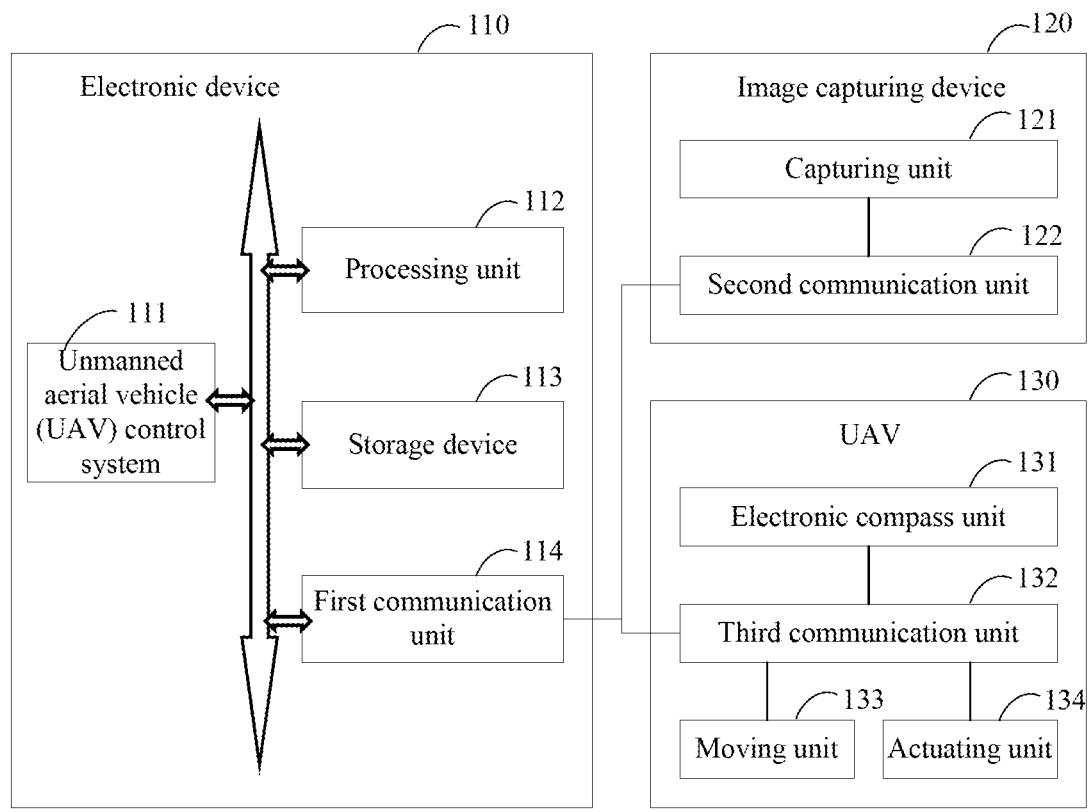
FIG. 1 is a block diagram of one embodiment of an electronic device including an unmanned aerial vehicle control system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

A "module," as used herein, refers to logic embodied in hardware or firmware, or to a collection of software instructions, written in a programming language, such as, JAVA, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable medium include CDs, DVDs, BLU-RAY, flash memory, and hard disk drives.

FIG. 1 illustrates an embodiment of an electronic device 110 including an unmanned aerial vehicle (UAV) control system 111. In the illustrated embodiment, the electronic device 110 can include a processing unit 112, a storage device 113, and a first communication unit 114, and the electronic device 110 can be coupled to an image capturing device 120 and a UAV 130. In the illustrated embodiment, the image capturing device 120 can include a capturing unit 121 and a second communication unit 122 communicating with the first communication unit 114, and the UAV 130 can include an electronic compass unit 131, a third communication unit 132 communicating with the first communication unit 114, a moving unit 133, and an actuating unit 134. The storage device 113 can store a plurality of instructions. When the plurality of instructions are executed by the processing unit 112, the processing unit 112 receives digital images of a flight area of the UAV 130 captured by the image capturing device 120, determines a flight position of the UAV 130 in the flight area based on the digital images, controls the UAV 130 to move from the flight position to a predetermined position, receives a vehicle direction of the UAV 130 from the electronic compass unit 131 of the UAV 130, adjusts the vehicle direction of the UAV 130 based on a predetermined direction, and controls the UAV 130 to perform a predetermined operation when the UAV 130 reaches the predetermined position and the vehicle direction is the same as the predetermined direction.

In at least one embodiment, the capturing unit 121 captures the digital images of the flight area, and the second communication unit 122 of the image capturing device 120 provides the digital images to the first communication unit 114. In at least one embodiment, the processing unit 112 detects the UAV 130 flying within the flight area based on the digital images, and determines distance information between the UAV 130 and the image capturing device 120. The processing unit 112 determines the flight position of the UAV 130 in the flight area based on the distance information.

In at least one embodiment, the processing unit 112 can estimate a flight path for the UAV 130 formed by comparing the flight position with the predetermined position stored in the storage device 113. The processing unit 112 can form the first control information based on the flight path for the UAV 130. When the UAV 130 receives the first control information, the UAV 130 can move from the flight position to the predetermined position along the flight path.

In at least one embodiment, the electronic compass unit 131 of the UAV 130 detects the vehicle direction of the UAV 13, and the third communication unit 132 of the UAV 130 provides the vehicle direction of the UAV 130 to the first communication 114 of the electronic device 110. In at least one embodiment, the processing unit 112 can estimate a rotating angle for the UAV 130 formed by comparing the vehicle direction with the predetermined direction stored in the storage device 113. The processing unit 112 can form the second control information based on the rotating angle for the UAV 130. When the UAV 130 receives the second control information, the UAV 130 can adjust the vehicle direction by rotating the UAV 130 towards the predetermined direction.

In at least one embodiment, the processing unit 112 can receive the digital images from the image capturing device 120 and the vehicle direction from the UAV 130 sequentially. Thus, the processing unit 112 can continuously check the flight position and the vehicle direction. When the processing unit 112 determines the flight position is the same as the predetermined position and the vehicle direction is the same as the predetermined direction, the processing unit 112 can control the UAV 130 to perform the predetermined operation stored in the storage device 113.

In at least one embodiment, there can be a plurality of image capturing devices 120 installed in the flight area. Since the image capturing devices 120 capture the digital images of the flight area from different directions, the processing unit 112 can combine the digital images with depth information to establish a three dimensional model of the flight area. In at least one embodiment, since the image capturing device captures the digital images of the UAV 130 from different directions, the processing unit 112 can combine the digital images with depth information to establish a flight model of the UAV 130. In at least one embodiment, the three dimensional model and the flight model can be stored in the storage device 113.

In at least one embodiment, the processing unit 112 sets one point in the three dimensional model as an origin, and sets three directions respectively perpendicular to each other as x-axis, y-axis, and z-axis to generate the three coordinate axes. In at least one embodiment, the three coordinate axes and the origin can be automatically set by the processing unit 112. In at least one embodiment, the three coordinate axes and the origin can be set artificially.

In at least one embodiment, the processing unit 112 compares the digital images with the three dimensional model to determine whether there is an object shown in the digital images based on the three dimensional model. Since the three dimensional model is formed by the digital images captured when the UAV 130 does not fly within the flight area, the object may be the UAV 130 when the processing unit 112 determines there is an object shown in the digital images.

In at least one embodiment, the processing unit 112 can compare the object with the flight model. When the processing unit 112 determines that the object is similar to the flight model, the processing unit 112 can determine the object as the UAV 130 and obtain distance information of the UAV. In at least one embodiment, the processing unit 112 estimates the flight position in the flight area based on the distance information and the digital images, and then determines the three coordinates of the flight position based on each of the three coordinate axes of the three dimensional model.

In at least one embodiment, when two UAVs fly within the flight area, the digital images of the flight area captured by the image capturing device 120 can include the image of the two UAVs. In at least one embodiment, the processing unit 112 detects the two UAVs flying within the flight area based on the digital images, and determines distance information between the two UAVs and the image capturing device 120 based on the digital images for two flight positions of the two UAVs.

In at least one embodiment, the processing unit 112 compares the two flight positions with two predetermined positions of the two UAVs to set two flight paths of the two UAVs. In at least one embodiment, if the two flight paths have an intersection point, the UAVs may collide with each other. Thus, the processing unit 112 can keep controlling the two flight positions to prevent collision. In at least one embodiment, if two distances between the two flight positions and the intersection point are less than a predetermined distance stored in the storage device 113, the processing unit 112 can determine that both of the two UAVs move close to the intersection point and that the two UAVs may collide with each other. Thus, the processing unit 112 can generate control information, provide the control information to one of the two UAVs, and control the one of the two UAVs to hover.

The processing unit 112 can be a processor, a central processing unit (CPU), a graphic processing unit (GPU), a system on chip (SoC), a field-programmable gate array (FPGA), or a controller for executing the program instruction in the storage device 113. The storage device 113 can be static RAM (SRAM), dynamic RAM (DRAM), EPROM, EEPROM, flash memory or other types of computer memory. The processing unit 112 can further include an embedded system or an application specific integrated circuit (ASIC) having embedded program instructions.

The storage device 113 can be a non-volatile computer readable storage medium that can be electrically erased and reprogrammed, such as read-only memory (ROM), random-access memory (RAM), erasable programmable ROM (EPROM), electrically EPROM (EEPROM), hard disk, solid state drive, or other forms of electronic, electromagnetic, or optical recording medium. In at least one embodiment, the storage device 113 can include interfaces that can access the aforementioned computer readable storage medium to enable the electronic device 1 to connect to and access such computer readable storage medium. In another embodiment, the storage device 113 can include network accessing device to enable the electronic device 1 to connect and access data stored in a remote server or a network-attached storage.

The first communication unit 114 of the electronic device 110 is in communication with the second communication unit 122 of the image capturing device 120 and the third communication unit 132 of the UAV 130. The first communication unit 114, the second communication unit 122, and the third communication unit 132 can adopt customized protocols or follow existing standards or de facto standards such as Ethernet, IEEE 802.11 or IEEE 802.15 series, Wireless USB or telecommunication standards such as GSM, CDMA2000, TD-SCDMA, WiMAX, 3GPP-LTE or TD-LTE. In some embodiment, the first communication unit 114, the second communication unit 122, and the third communication unit 132 can be a customized connector or a standard connector such as USB connector.

In at least one embodiment, the electronic device 1 can be a server, a desktop computer, a laptop computer, or other electronic devices. Moreover, FIG. 1 illustrates only one example of an electronic device 1, and other examples can include more or fewer components than illustrated, or have a different configuration of the various components in other embodiments.

In at least one embodiment, the capturing unit 121 of the image capturing device 120 can be a depth-sensing camera, such as a time-of-fight (TOF) camera. The TOF camera can emit a signal with a particular wavelength when capturing the image. When the signal reaches the object, the signal would be reflected and then received by the TOF camera. The difference between the emitting time and the receiving time is directly proportional to the distance between the object and the TOF camera. Thereby, the TOF camera can obtain the distance information indicating distances between points on an object and the image capturing device 120.

In at least one embodiment, the UAV 130 is moved by using a moving unit 133. The electronic compass unit 131 can be a magnetometer. The electronic compass unit 131 detects the movement and orientation of the UAV 130 when it is moving.

Figure 2:
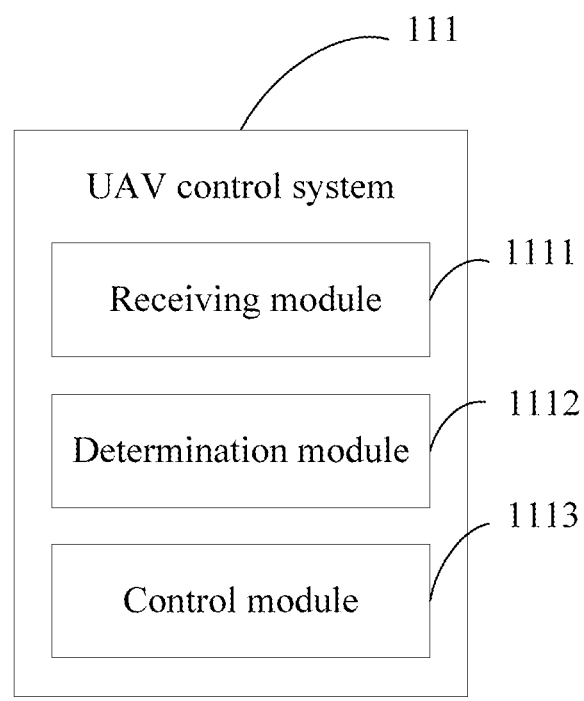
FIG. 2 is a block diagram of one embodiment of function modules of the unmanned aerial vehicle control system in the electronic device of FIG. 1.

FIG. 2 illustrates an embodiment of function modules of the UAV control system 111 in the electronic device 110 of FIG. 1. In the illustrated embodiment, the UAV control system 111 can include one or more modules, for example, a receiving module 1111, a determination module 1112, and a control module 1113.

The receiving unit 1111 receives digital images of a flight area of a UAV 130 captured by the image capturing device 120, and receives a vehicle direction of the UAV 130 from the electronic compass unit 131 of the UAV 130. The determination module 1112 determines a flight position of the UAV 130 in the flight area based on the digital images. The control module 1113 controls the UAV 130 to move from the flight position to a predetermined position, adjusts the vehicle direction of the UAV 130 based on a predetermined direction, and controls the UAV 130 to perform a predetermined operation when the UAV 130 reaches the predetermined position and the vehicle direction is the same as the predetermined direction.

Figure 3:
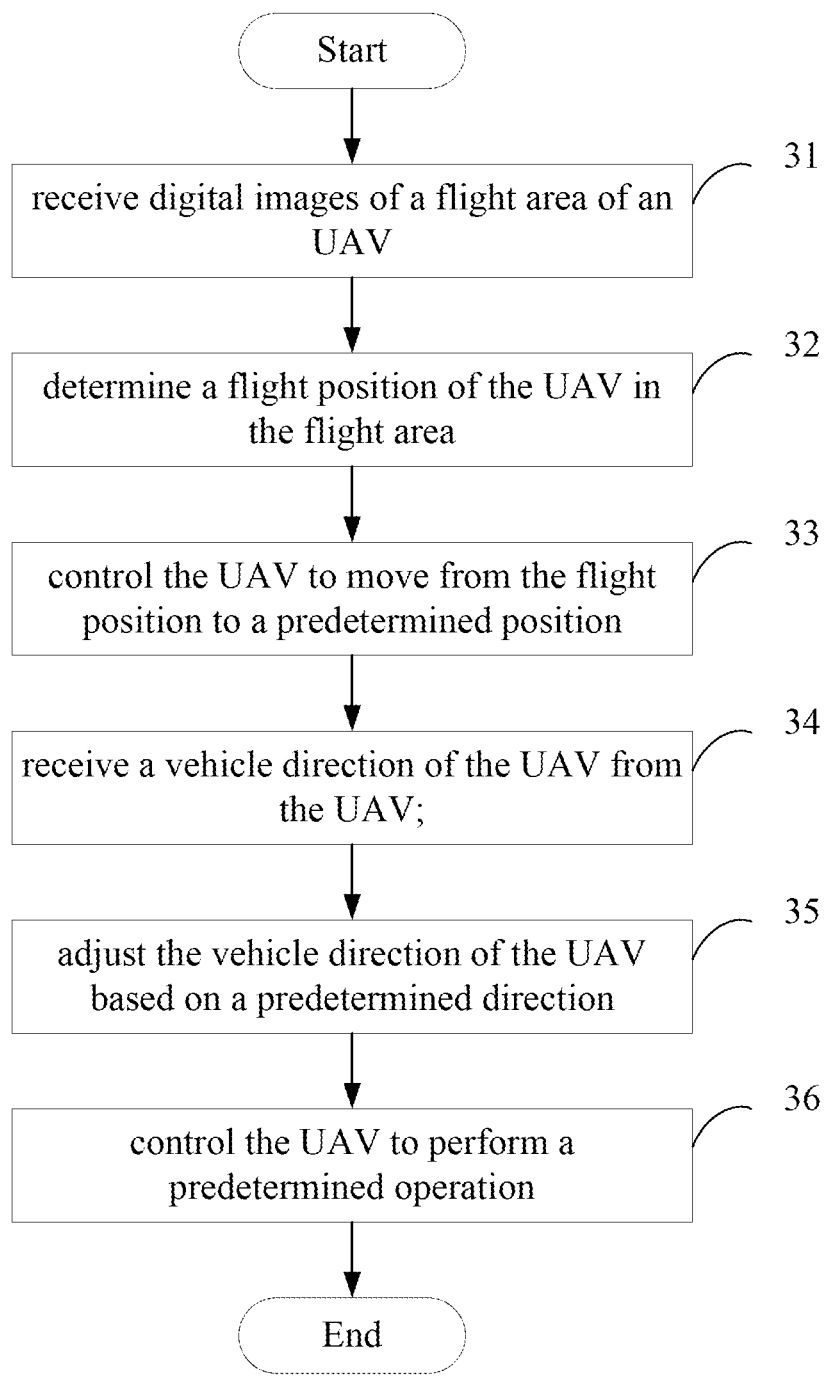
FIG. 3 illustrates a flowchart of one embodiment of an unmanned aerial vehicle control method for the electronic device of FIG. 1.

FIG. 3 illustrates a flowchart in accordance with an example embodiment. The example method is provided by way of example, as there are a variety of ways to carry out the method. The method described below can be carried out using the configuration illustrated in FIGS. 1 and 2, for example, and various elements of these figures are referenced in explaining example method. Each block shown in FIG. 3 represents one or more processes, methods, or subroutines, carried out in the example method. Furthermore, the order of blocks is illustrative only and can change. Additional blocks can be added or fewer blocks can be utilized, without departing from this disclosure. The example method can begin at block 31.

At block 31, the receiving module 1111 receives digital images of a flight area of an UAV 130. In at least one embodiment, the digital images are captured by the capturing unit 121 of the image capturing device 120. In at least one embodiment, the UAV 130 flies within the flight area.

In at least one embodiment, the capturing unit 121 captures the digital images of the flight area. The second communication unit 122 of the image capturing device 120 provides the digital images to the first communication unit 114.

At block 32, the determination module 1112 determines a flight position of the UAV 130 in the flight area. In at least one embodiment, the determination module 1112 detects the UAV 130 flying within the flight area based on the digital images, and determines distance information between the UAV 130 and the image capturing device 120. The determination module 1112 determines the flight position of the UAV 130 in the flight area based on the distance information.

In at least one embodiment, in order to determine the flight position, the determination module 1112 can check whether there is an UAV shown in the digital images, and then determines the relative position between the UAV 130 and the image capturing device 120. Thus, before the receiving module 1111 starts to determine the flight position, the electronic device 10 can perform a preparatory method to establish a flight model for detecting the UAV 130 and a three dimensional model of the flight area for determining the flight position. A detailed description of the preparatory method refers to FIG. 4.

In at least one embodiment, when the determination module 1112 receives the flight model, the three dimensional model and the digital images from the storage device 113 and the receiving module 1111, the determination module 1112 can detect the UAV 130 in the digital images based on the flight model, and determine the flight position of the UAV 130 in the digital images based on the three dimensional model. A detailed description of the position determination method refers to FIG. 5.

At block 33, the control module 1113 controls the UAV 130 to move from the flight position to a predetermined position. In at least one embodiment, the control module 1113 can generate a first control information, and provide the first control information to the third communication unit 132 of the UAV 130 by the first communication unit 114 of the electronic device 110.

In at least one embodiment, the determination module 1112 can estimate a flight path for the UAV 130 formed by comparing the flight position with the predetermined position stored in the storage device 113. The control module 1113 can form the first control information based on the flight path for the UAV 130. When the UAV 130 receives the first control information, the UAV 130 can move from the flight position to the predetermined position along the flight path.

In at least one embodiment, when the control module 1113 controls the UAV 130 to move, the moving unit 133 of the UAV 130 can provide a power to move the UAV 130 along the flight path. In at least one embodiment, the moving unit 133 can be a propeller of the UAV 130.

At block 34, the receiving module 1111 receives vehicle direction of the UAV 130 from the UAV 130. In at least one embodiment, the electronic compass unit 131 of the UAV 130 detects the vehicle direction of the UAV 13, and the third communication unit 132 of the UAV 130 provides the vehicle direction of the UAV 13 to the first communication 114 of the electronic device 110.

At block 35, the control module 1113 adjusts the vehicle direction of the UAV 130 based on a predetermined direction. In at least one embodiment, the control module 1113 can generate a second control information, and provide the second control information to the third communication unit 132 of the UAV 130 by the first communication unit 114 of the electronic device 110.

In at least one embodiment, the determination module 1112 can estimate a rotating angle for the UAV 130 formed by comparing the vehicle direction with the predetermined direction stored in the storage device 113. The control module 1113 can form the second control information based on the rotating angle for the UAV 130. When the UAV 130 receives the second control information, the UAV 130 can adjust the vehicle direction by rotating the UAV 130 towards the predetermined direction.

In at least one embodiment, when the control module 1113 adjusts the vehicle direction of the UAV 130, the moving unit 133 of the UAV 130 can provide a power to change the vehicle direction of the UAV 130 toward the predetermined direction.

At block 36, the control module 1113 controls the UAV 130 to perform a predetermined operation. In at least one embodiment, the control module 1113 can generate a third control information, and provide the third control information to the third communication unit 132 of the UAV 130 by the first communication unit 114 of the electronic device 110. In at least one embodiment, when the UAV 130 reaches the predetermined position and the vehicle direction of the UAV 130 is towards the predetermined direction, the control module 1113 can control the UAV 130 to perform the predetermined operation.

In at least one embodiment, the electronic device 110 can receive the digital images from the image capturing device 120 and the vehicle direction from the UAV 130 sequentially. Thus, the electronic device 110 can continuously check the flight position and the vehicle direction. When the determination module 1112 determines the UAV 130 reaches the predetermined position and the vehicle direction of the UAV 130 is towards the predetermined direction, the control module 1113 can control the UAV 130 to perform the predetermined operation stored in the storage device 113.

In at least one embodiment, when the actuating unit 134 of the UAV 130 is a clamp device, the predetermined operation can be a first action to clamp a target or a second action to release the target. In at least one embodiment, when the actuating unit 134 of the UAV 130 is a pipette, the predetermined operation can be a first action to draw liquid up or a second action to dispense the liquid. In at least one embodiment, the UAV 130 can include a charger unit and a battery, and the charger unit can be regarded as an actuating unit 134. Thus, when the UAV 130 reaches a battery charger station, whose position is a predetermined position, the predetermined operation can be an action to charge the battery.

Figure 4:
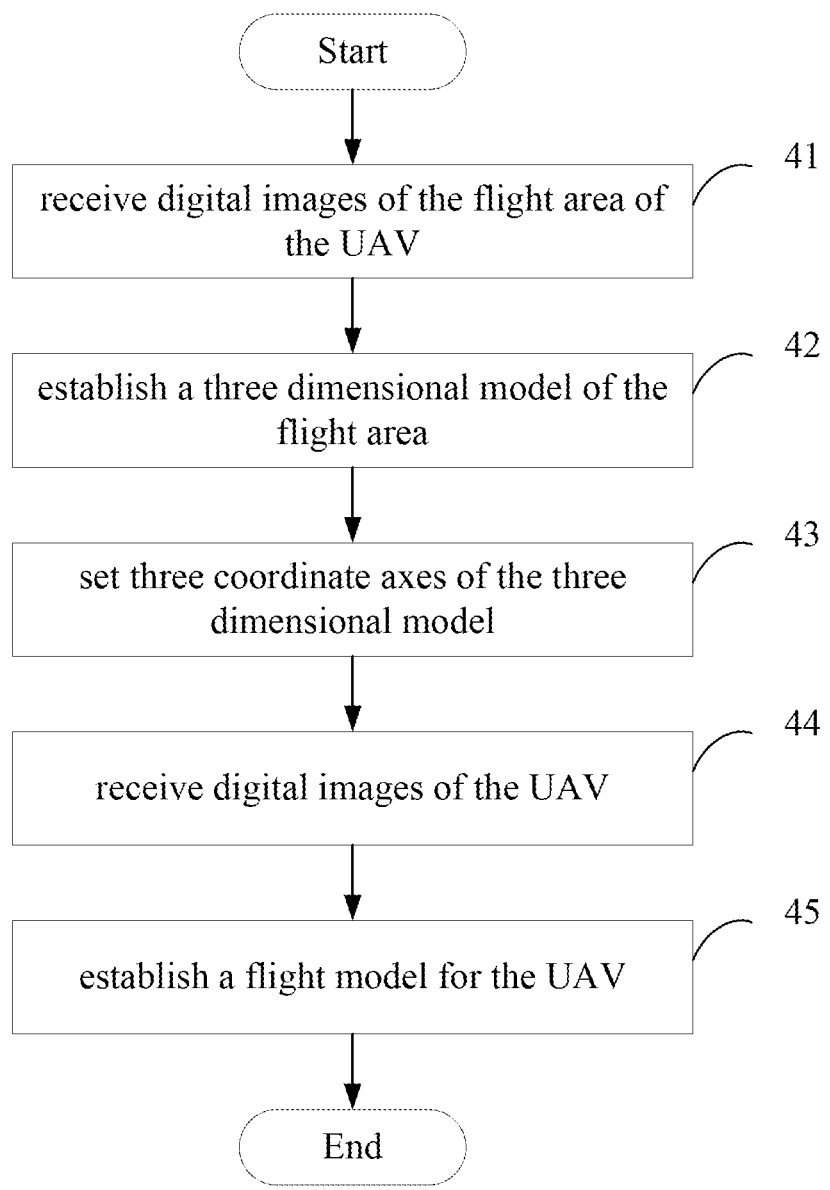
FIG. 4 illustrates a flowchart of one embodiment of a preparatory process of the unmanned aerial vehicle control method for the electronic device of FIG. 1.

FIG. 4 illustrates a flowchart in accordance with an example embodiment. The example method is provided by way of example, as there are a variety of ways to carry out the method. The method described below can be carried out using the configuration illustrated in FIGS. 1 and 2, for example, and various elements of these figures are referenced in explaining example method. Each block shown in FIG. 4 represents one or more processes, methods, or subroutines, carried out in the example method. Furthermore, the order of blocks is illustrative only and can change. Additional blocks can be added or fewer blocks can be utilized, without departing from this disclosure. The example method can begin at block 41.

At block 41, the receiving module 1111 receives digital images of a flight area. In at least one embodiment, the digital images for establishing a three dimensional model are captured by the capturing unit 121 of the image capturing device 120, when the UAV 130 does not fly within the flight area. The second communication unit 122 of the image capturing device 120 transmits the digital images to the first communication unit 114.

At block 42, the determination module 1112 establishes the three dimensional model of the flight area. In at least one embodiment, the determination module 1112 establishes the three dimensional model based on the digital images of the flight area.

In at least one embodiment, there can be more than one image capturing devices installed in the flight area. The image capturing devices can be a depth-sensing camera. Thus, each of the digital images can be a specific image with depth information captured from one direction. The depth information indicates distances between points on an object and the image capturing devices. In at least one embodiment, since the image capturing devices capture the digital images from different directions, the determination module 1112 can combine the digital images with the depth information to establish the three dimensional model. In at least one embodiment, the three dimensional model can be stored in the storage device 113.

At block 43, the determination module 1112 sets three coordinate axes of the three dimensional model. In at least one embodiment, the determination module 1112 sets one point in the three dimensional model as an origin, and sets three dimensional coordinate system, such as Cartesian coordinate system having x-axis, y-axis, and z-axis, to generate the three coordinate axes.

In at least one embodiment, the three coordinate axes and the origin can be automatically set by the determination module 1112. In at least one embodiment, the three coordinate axes and the origin can be set artificially. In at least one embodiment, the three coordinate axes can be stored in the storage device 113.

At block 44, the receiving module 1111 receives digital images of the UAV 130. In at least one embodiment, the digital images are captured by the capturing unit 121 of the image capturing device 120. The second communication unit 122 of the image capturing device 120 transmits the digital images of the UAV 130 to the first communication unit 114.

At block 45, the determination module 1112 establishes a flight model for the UAV 130. In at least one embodiment, the determination module 1112 establishes the flight model based on the digital images of the UAV 130.

In at least one embodiment, the digital images of the UAV 130 can be captured from different directions by the image capturing device 120. Since the image capturing device can be a depth sensing camera, each of the digital images can be a specific image with depth information captured from one direction. In at least one embodiment, since the image capturing device 120 captures the digital images of the UAV 130 from different directions, the determination module 1112 can combine the digital images with the depth information to establish the flight model. In at least one embodiment, the flight model can be stored in the storage device 113.

In at least one embodiment, the flight model of the UAV 130 can include a plurality of specific images captured from different directions. The plurality of specific images can be used to compare with an object for determining whether the object is a UAV.

Figure 5:
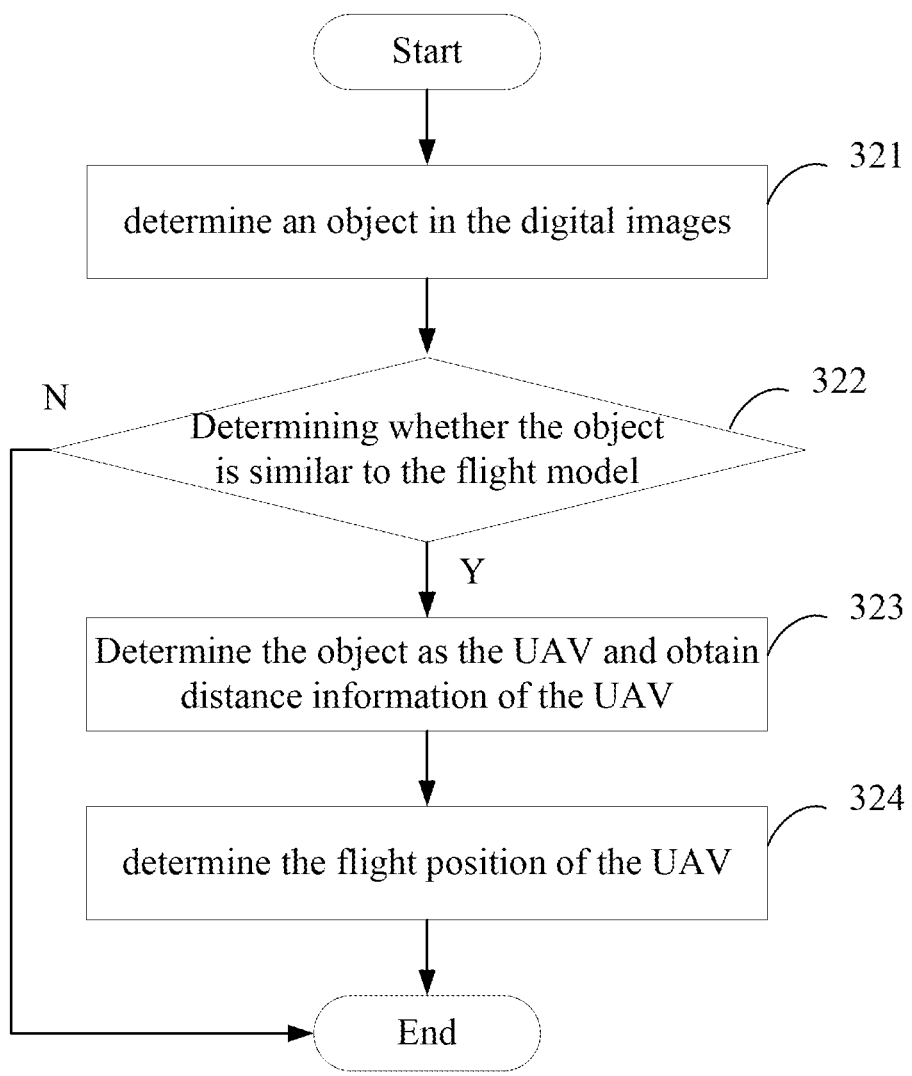
FIG. 5 illustrates a flowchart of one embodiment of a position determination method for the electronic device of FIG. 1.

FIG. 5 illustrates a flowchart in accordance with an example embodiment. The example method is provided by way of example, as there are a variety of ways to carry out the method. The method described below can be carried out using the configuration illustrated in FIGS. 1 and 2, for example, and various elements of these figures are referenced in explaining example method. Each block shown in FIG. 5 represents one or more processes, methods, or subroutines, carried out in the example method. Furthermore, the order of blocks is illustrative only and can change. Additional blocks can be added or fewer blocks can be utilized, without departing from this disclosure. In at least one embodiment, FIG. 5 can be a detailed description of block 32 in FIG. 3. The example method can begin at block 321.

At block 321, the determination module 1112 determines an object in the digital images.

In at least one embodiment, the determination module 1112 compares the digital images with the three dimensional model to determine whether there is an object shown in the digital images. Since the three dimensional model is formed by the digital images captured when the UAV 130 does not fly within the flight area, the object may be the UAV 130 when the determination module 1112 determines the object in the digital images is not included in the three dimensional model.

At block 322, the determination module 1112 determines whether the object is similar to the flight model. In at least one embodiment, if the object is similar to the flight model, the procedure goes to block 323. In at least one embodiment, if the object is not similar to the flight model, the procedure ends.

In at least one embodiment, the determination module 1112 can compare the object with the flight model. In at least one embodiment, the determination module 1112 can select a specific view of the flight model from one direction, and compare the object with the specific view of the flight model. In at least one embodiment, the determination module 1112 can select one of the specific images included in the flight model, and compare the object with the selected specific image. In at least one embodiment, when the determination module 1112 determines that the object is similar to the specific view of the flight model or the selected specific image, the determination module 1112 can determine the object as the UAV 130. For example, the determination module 1112 can compare the pixel values of the object with the pixel values of the flight model.

At block 323, the determination module 1112 determines the object as the UAV 130, and obtains the distance information of the UAV 130. In at least one embodiment, the distance information is obtained from the digital images of the flight area received by the receiving module 1111.

At block 324, the determination module 1112 determines the flight position of the UAV 130. In the at least one embodiment, the determination module 1112 determines the flight position of the UAV 130 based on the distance information.

In at least one embodiment, the determination module 1112 estimates the flight position in the flight area based on the distance information and the digital images, and then determines the three coordinates of the flight position for each of the three coordinate axes of the three dimensional model.

Figure 6:
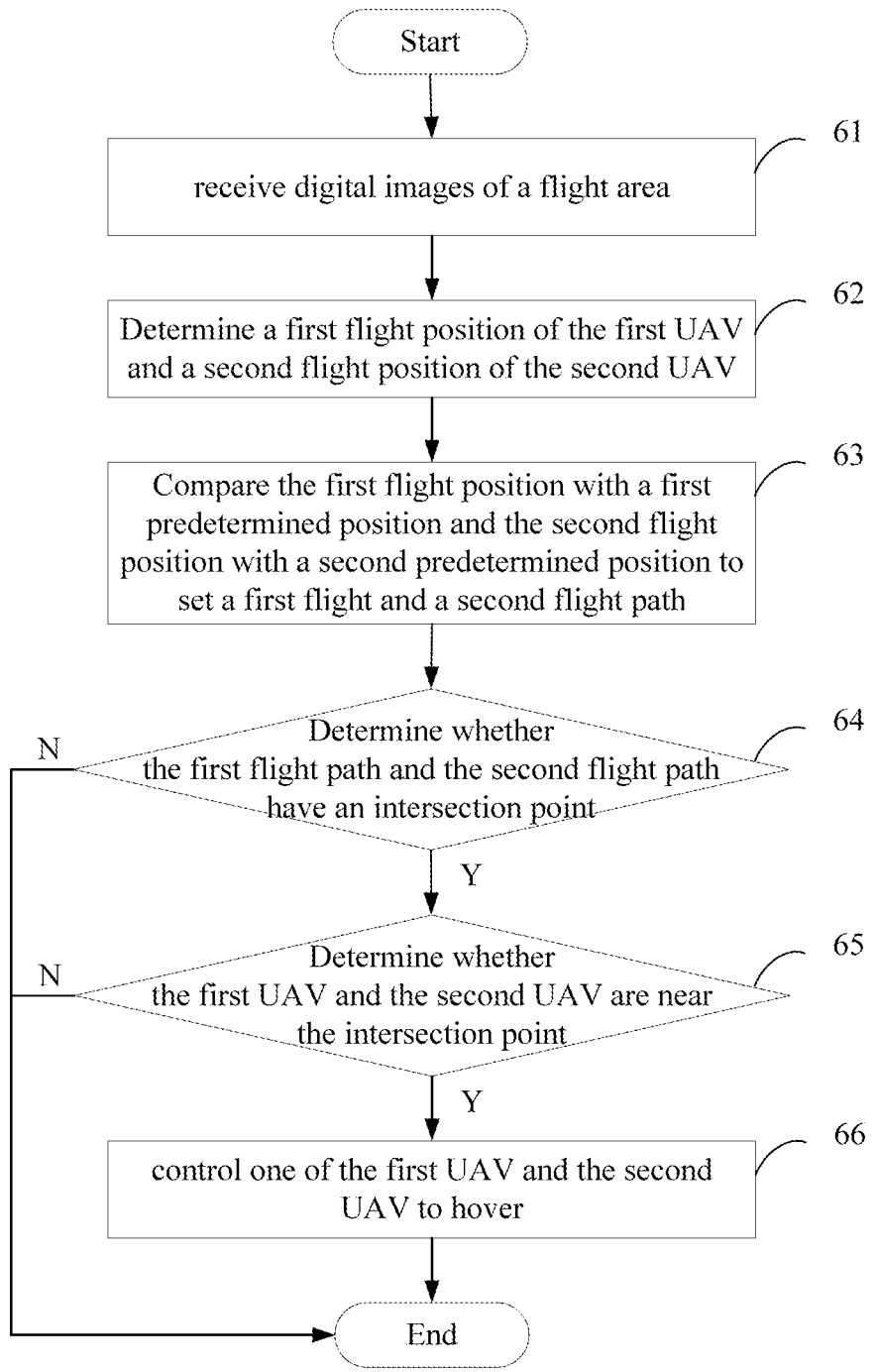
FIG. 6 illustrates a flowchart of one embodiment of an unmanned aerial vehicle control method for the electronic device of FIG. 1.

FIG. 6 illustrates a flowchart in accordance with an example embodiment. The example method is provided by way of example, as there are a variety of ways to carry out the method. The method described below can be carried out using the configuration illustrated in FIGS. 1 and 2, for example, and various elements of these figures are referenced in explaining example method. Each block shown in FIG. 6 represents one or more processes, methods, or subroutines, carried out in the example method. Furthermore, the order of blocks is illustrative only and can change. Additional blocks can be added or fewer blocks can be utilized, without departing from this disclosure. The example method can begin at block 61.

At block 61, the receiving module 1111 receives digital images of a flight area. In at least one embodiment, the digital images are captured by the image capturing device.

Figure 7:
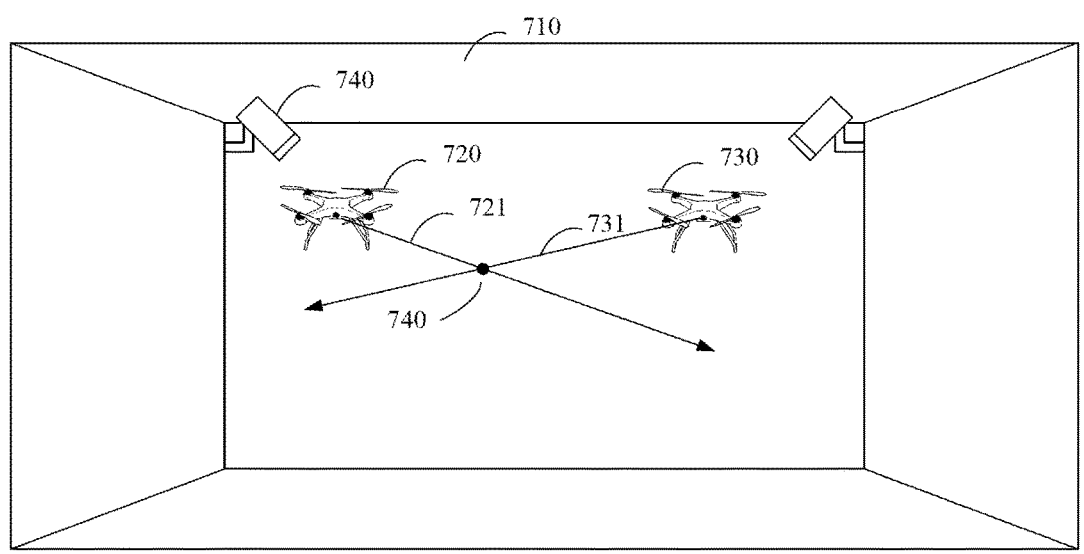
FIG. 7 is a diagrammatic view of one embodiment of two unmanned aerial vehicles flying within the flight area.

FIG. 7 illustrates that a first UAV 720 and a second UAV 730 fly within a flight area 710. In the illustrated embodiment, the image capturing device 740 captures the digital images of the flight area 710. The second communication unit 122 of the image capturing device 740 transmits the digital images to the first communication unit 114 of the electronic device 110.

At block 62, the determination module 1112 determines a first flight position of the first UAV 720 and a second flight position of the second UAV 730 in the flight area 710. In at least one embodiment, the determination module 1112 detects the first UAV 720 and the second UAV 730 flying within the flight area 710 based on the digital images, and determines first distance information between the first UAV 720 and the image capturing device 740 and second distance information between the second UAV 730 and the image capturing device 740. The determination module 1112 determines the first flight position of the first UAV 720 based on the first distance information, and determines the second flight position of the second UAV 730 based on the second distance information.

At block 63, the determination module 1112 compares the first flight position with a first predetermined position to set a first flight path 721 and compares the second flight position with a second predetermined position to set a second flight path 731.

In at least one embodiment, after the first flight path 721 and the second flight path 731 are determined, the control module 1113 can form the control information based on the first flight path 721 for the first UAV 720 and the second flight path 731 for the second UAV 730. When the first UAV 720 and the second UAV 730 receive the control information, the first UAV 720 can move from the first flight position to the first predetermined position along the first flight path 721 and the second UAV 730 can move from the second flight position to the second predetermined position along the second flight path 731.

At block 64, the determination module 1112 determines whether the first flight path 721 and the second flight path 731 have an intersection point 740. In at least one embodiment, if the first flight path 721 and the second flight path 731 have an intersection point 740, the procedure goes to block 65. In at least one embodiment, if there is no intersection point between the first flight path 721 and the second flight path 731, the procedure ends.

In at least one embodiment, when the determination module 1112 determines whether there is an intersection point 740, the determination module 1112 can consider the sizes of the first UAV 720 and the second UAV 730. If a point of the first flight path 721 is close to another point of the second flight path 731, the determination module 1112 still can determine there is an intersection point 740 even if the first flight path 721 does not intersect with the second flight path 731. In at least one embodiment, the determination module 1112 can determine based on a distance threshold. When the minimum distance of the first flight path 721 and the second flight path 731 is less than the distance threshold, the determination module 1112 determines there is an intersection point 740. In at least one embodiment, the distance threshold can be formed by adding the sizes of the first UAV 720 and the second UAV 730 together, and stored in the storage device 113.

At block 65, the determination module 1112 determines whether the first UAV 720 and the second UAV 730 are near the intersection point 740. In at least one embodiment, if both of the first UAV 720 and the second UAV 730 are near the intersection point 740, the procedure goes to block 66. In at least one embodiment, if one of the first UAV 720 and the second UAV 730 is not near the intersection point 740, the procedure ends.

In at least one embodiment, the determination module 1112 determines whether a first distance between the intersection point 740 and the first flight position and a second distance between the intersection point 740 and the second flight position are less than a predetermined distance stored in the storage device 113. If both of the first distance and the second distance are less than the predetermined distance, the determination module 1112 can determine the first UAV 720 and the second UAV 730 are near the intersection point 740

At block 66, the control module 1113 controls one of the first UAV 720 and the second UAV 730 to hover. In at least one embodiment, the control module 1113 can generate control information, and provide the control information to one of the first UAV 720 and the second UAV 730.

In at least one embodiment, the determination module 1112 can determine which one of the first UAV 720 and the second UAV 730 approaches the intersection point 740 later than the other one, and then the control module 1113 can provide the control information to the determined UAV for preventing collision.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in matters of shape, size, and arrangement of the parts within the principles of the present disclosure, up to and including, the full extent established by the broad general meaning of the terms used in the claims.

What is claimed is:

1. An electronic device comprising:
   a processing unit; and
   a storage device that storing a plurality of instructions, wherein when the plurality of instructions is executed by the processing unit, the processing unit is configured to:
   receive digital images of a flight area of an unmanned aerial vehicle (UAV) captured by an image capturing device;
   determine a flight position of the UAV in the flight area based on the digital images;
   control the UAV to move from the flight position to a predetermined position;
   receive a vehicle direction of the UAV from an electronic compass unit of the UAV;
   adjust the vehicle direction of the UAV based on a predetermined direction; and
   control the UAV to perform a predetermined operation when the UAV reaches the predetermined position and the vehicle direction is the same as the predetermined direction;
   wherein the plurality of instructions executed by the processing unit further cause the processing unit to:
   establish a three dimensional model of the flight area; and
   set three coordinate axes of the three dimensional model;
   wherein a flight path is formed by comparing the flight position with the predetermined position.

2. The electronic device according to claim 1, wherein the plurality of instructions executed by the processing unit further cause the processing unit to:
   determine flight coordinates of the UAV based on the three coordinate axes; and
   establish a flight model for the UAV.

3. The electronic device according to claim 2, wherein the plurality of instructions further cause the processing unit to:
   determine an object in the digital images;
   determine the object as the UAV based on the flight model;
   determine distance information of the UAV based on the digital images; and
   determine the flight position of the UAV based on the distance information.

4. A method for controlling a first unmanned aerial vehicle (UAV) and a second UAV, comprising:
   receiving digital images of a flight area of the first UAV and the second UAV captured by an image capturing device;
   determining a first flight position of the first UAV and a second flight position of the second UAV in the flight area based on the digital images;
   comparing the first flight position with a first predetermined position to set a first flight path;
   comparing the second flight position with a second predetermined position to set a second flight path;
   determining whether the first flight path and the second flight path have an intersection point;
   determining whether a first distance between the intersection point and the first flight position and a second distance between the intersection point and the second flight position are less than a predetermined distance when the first flight path and the second flight path have an intersection point; and
   controlling one of the first UAV and the second UAV to hover when both of the first distance and the second distance are less than the predetermined distance.

5. The electronic device according to claim 1, wherein the UAV receives the flight path and moves along the flight path.

6. The electronic device according to claim 1, wherein the image capturing device coupled to the electronic device is a depth-sensing camera.

7. The electronic device according to claim 1, wherein the UAV coupled to the electronic device includes an actuating unit for performing the predetermined operation.

8. A method for controlling a first unmanned aerial vehicle (UAV), comprising:
   receiving digital images of a flight area of the first UAV captured by an image capturing device;
   determining a first flight position of the first UAV in the flight area based on the digital images;
   controlling the first UAV to move from the first flight position to a first predetermined position;
   receiving a vehicle direction of the first UAV from an electronic compass unit of the first UAV;
   adjusting the vehicle direction of the first UAV based on a predetermined direction;
   controlling the first UAV to perform a predetermined operation when the first UAV reached the first predetermined position and the vehicle direction being the same as the predetermined direction;
   establishing a three dimensional model of the flight area; and
   setting three coordinate axes of the three dimensional model.

9. The method according to claim 8, comprising:
   determining flight coordinates of the first UAV based on the three coordinate axes; and
   establishing a flight model for the UAV.

10. The method according to claim 9, wherein the step of determining the first flight position of the first UAV in the flight area based on the digital images further comprising:
    determining an object in the digital images;
    determining the object as the first UAV based on the flight model;
    determining distance information of the first UAV based on the digital images; and
    determining the first flight position of the first UAV based on the distance information.

11. The method according to claim 8, wherein the image capturing device is a depth-sensing camera.

12. The method according to claim 8, comprising:
determining a second flight position of a second UAV in the flight area based on the digital images;
comparing the first flight position with the first predetermined position to set a first flight path;
comparing the second flight position with a second predetermined position to set a second flight path;
determining whether the first flight path and the second flight path have an intersection point;
determining whether a first distance between the intersection point and the first flight position and a second distance between the intersection point and the second flight position being less than a predetermined distance when the first flight path and the second flight path having an intersection point; and
controlling one of the first UAV and the second UAV to hover when both of the first distance and the second distance being less than the predetermined distance.

* * * * *